(12) United States Patent
Lefaux et al.

(10) Patent No.: US 12,398,645 B2
(45) Date of Patent: Aug. 26, 2025

(54) METHOD FOR MANUFACTURING A BLADE FOR A TURBOMACHINE

(71) Applicants: SAFRAN, Paris (FR); SAFRAN AERO BOOSTERS, Herstal (BE)

(72) Inventors: Yann Jean-Pierre Lefaux, Herstal (BE); Pierre Jean Sallot, Moissy-Cramayel (FR)

(73) Assignees: SAFRAN, Paris (FR); SAFRAN AERO BOOSTERS, Herstal (BE)

( * ) Notice: Subject to any disclaimer, the term of this patent is extended or adjusted under 35 U.S.C. 154(b) by 77 days.

(21) Appl. No.: 18/034,166

(22) PCT Filed: Oct. 25, 2021

(86) PCT No.: PCT/EP2021/079460
§ 371 (c)(1),
(2) Date: Apr. 27, 2023

(87) PCT Pub. No.: WO2022/090116
PCT Pub. Date: May 5, 2022

(65) Prior Publication Data
US 2023/0407751 A1    Dec. 21, 2023

(30) Foreign Application Priority Data
Oct. 27, 2020    (EP) .................................. 20306289

(51) Int. Cl.
*F01D 5/18*    (2006.01)
*B22D 17/00*    (2006.01)
(Continued)

(52) U.S. Cl.
CPC ............... *F01D 5/18* (2013.01); *B22D 17/00* (2013.01); *B22D 19/0072* (2013.01);
(Continued)

(58) Field of Classification Search
CPC ........ F01D 5/18; B22D 19/0072; B22D 19/04
See application file for complete search history.

(56) References Cited

U.S. PATENT DOCUMENTS

| 5,226,469 A * | 7/1993 | Matsumura ............ B22D 19/04 |
| | | 164/111 |
| 6,328,092 B1 * | 12/2001 | Guetlbauer ............ B22D 19/04 |
| | | 164/111 |

(Continued)

FOREIGN PATENT DOCUMENTS

| FR | 3081370 A1 | 11/2019 |
| WO | WO 9733009 A1 | 9/1997 |

OTHER PUBLICATIONS

First 3D-printed Gas Turbine Blades: Siemens awarded by American Society of Mechanical Engineers, Siemens, Published on Dec. 13, 2017, available at https://press.siemens.com/global/en/pressrelease/first-3d-printed-gas-turbine-blades-siemens-awarded-american-society-mechanical (Year: 2017).*

(Continued)

*Primary Examiner* — Kyle A Cook
(74) *Attorney, Agent, or Firm* — Cozen O'Connor

(57) ABSTRACT

A method for manufacturing a blade for a turbine engine, including a root connected to a vane extending in a longitudinal direction, includes providing an assembly having a first part intended to form a root of the blade and a projecting second part projecting in the longitudinal direction from the first part; providing a mold comprising a first impression and a second impression delimiting together a cavity, said cavity comprising a first space and a second space; arranging the first part in the first space of the cavity and the second part in the second space of the cavity; and forming a third part by injecting an aluminium-based alloy in the cavity.

7 Claims, 3 Drawing Sheets

(51) Int. Cl.
   *B22D 19/00*   (2006.01)
   *B22D 19/04*   (2006.01)
(52) U.S. Cl.
   CPC .......... *B22D 19/04* (2013.01); *F05D 2230/21* (2013.01); *F05D 2300/173* (2013.01); *F05D 2300/174* (2013.01)

(56) References Cited

U.S. PATENT DOCUMENTS

| | | | |
|---|---|---|---|
| 2007/0274854 A1 | 11/2007 | Kelly et al. | |
| 2015/0211372 A1* | 7/2015 | Wilson | F01D 5/147 164/76.1 |
| 2017/0136534 A1* | 5/2017 | Casteilla | B22C 1/00 |
| 2017/0173667 A1* | 6/2017 | Arnett | B22C 9/24 |
| 2017/0292382 A1* | 10/2017 | Castle | B22D 19/16 |
| 2020/0109635 A1* | 4/2020 | Heneveld | F01D 5/183 |
| 2022/0074307 A1* | 3/2022 | Kray | F01D 5/284 |
| 2023/0018317 A1* | 1/2023 | Belaygue | B22F 10/66 |

OTHER PUBLICATIONS

International Patent Application No. PCT/EP2021/079460 International Search Report dated Feb. 1, 2022, 4 pages.

* cited by examiner

METHOD FOR MANUFACTURING A BLADE FOR A TURBOMACHINE

CROSS-REFERENCE TO RELATED APPLICATIONS

This application is a US National phase Application of International Patent Application No. PCT/EP2021/079460 filed Oct. 25, 2021, which claims priority to EP No. 20306289.9 filed Oct. 27, 2020, titled "Method for Manufacturing a Turbomachine Blade," all of which are hereby incorporated in their entireties.

TECHNICAL FIELD OF THE INVENTION

The present document relates to a method for manufacturing a blade for a turbine engine including a root made from titanium-based alloy connected to an aluminium-based vane.

PRIOR ART

A novel turbine-engine architecture is sought in order to meet the aviation requirements. This novel architecture requires use of compressors capable of withstanding high rotation speeds. This change in architecture gives rise to additional or new stresses, which it is necessary to consider in manufacturing the rotor and stator blades 2 of compressors.

Among these, the mass of the rotating blades is in particular a challenge. Conventionally, manufacturing blades comprising a root and a vane is known, the blades being produced from titanium in order to provide a certain mechanical strength to the assembly. However, blades made from titanium alloy impose high centrifugal forces, in particular on the disc carrying said blades, making the search for low-density material solutions necessary.

Using alloys such as aluminium in order to reduce the density of the blade is not consequence-free. As illustrated in FIG. 1, the current methods for welding a vane 4 made from aluminium-based alloy to a root 6 made from a titanium-based alloy lead to loading solely a connecting zone 8 between said root 6 and the vane 4. This welding is very difficult or even impossible to implement with conventional welding methods because of the nature of the two materials to be put in contact. This is because the melting points of titanium and of aluminium are too different and this welding then causes the formation of fragile intermetallic phases in the connecting zone 8. Even if welding is still possible, the connecting zone 8 between the vane 4 and the root 6 forming a surface-surface interface, containing fragile intermetallic phases, risks rupturing since all the forces between the vane 4 and the root 6 are concentrated on the fragile connecting zone 8. This risk of rupture is all the greater when the rotation speeds of the turbine engine are high.

The problem remains similar if use is made of other assembly methods such as brazing or riveting. This is because, in such situations, a piercing in the connecting zone 8 causes a concentration of the mechanical stresses in this connecting zone 8 that may cause cracks.

SUMMARY OF THE INVENTION

The present document relates to a method for manufacturing a blade for a turbine engine including a root connected to a vane extending in a longitudinal direction, the method comprising the steps:

providing an assembly comprising:
   a first part intended to form a root of the blade, this first part being produced from a titanium-based alloy,
   a second part extending projecting in the longitudinal direction from the first part;
providing a mould comprising a first impression and a second impression delimiting together a cavity in which the blade is intended to be formed, said cavity comprising a first space intended to form the vane and a second space intended to form the root;
arranging the first part in the first space of the cavity and the second part in the second space of the cavity;
injecting an aluminium-based alloy, this alloy forming a third part in which the second part is embedded.

In this way, the third part of the blade made from an aluminium-based alloy injected into the mould will embed the second part, which thus ensures optimum radial holding of the third part on the blade root. The connection between the blade and the root is therefore no longer a problem: the second part provides mechanical assembly and a means of attachment between the root and the vane. It will be understood that the second part and the third part form together the vane.

The first part is made from a titanium-based alloy having a melting point of between 1600 and 1700° C. and the second is made from an aluminium-based alloy having a melting point of between 500 and 600° C. This difference between the melting points of aluminium and titanium limits the interactions between the third part on the one hand and the first part and second part on the other hand and thus limits the formation of fragile phases.

The assembly can be produced in additive manufacturing.

The second part may comprise a general U shape including a first arm and a second arm connected by a top part.

Through its shape, the second part stiffens the vane when the vane is not sufficiently stiff. This second part therefore comprises, through its shape, a means for adjusting the stiffness of the vane.

The first arm and/or the second arm may comprise protrusions.

The protrusions give rise to a large specific surface area providing effective anchoring of the first part with the third part.

The protrusions may include protrusions extending transversely towards the inside of the general U shape and/or protrusions extending transversely towards the outside of the general U shape.

Said second part may include at least one internal air-circulation circuit able to receive the hot air coming from outside the blade.

The internal air-circulation circuit of the second part thus heats the vane and thus avoids the accretion of ice.

The internal air-circulation circuit may comprise air outlets emerging on an external surface of the third part.

This internal air-circulation circuit also modifies the aerodynamics of the vane and takes off a limit layer circulating in the vicinity of the first part and in the vicinity of the external surface of the third part forming a trailing edge.

BRIEF DESCRIPTION OF THE FIGURES

in FIG. 2A a schematic representation of a first embodiment of an assembly comprising a first part and a second part according to the invention;

in FIG. 2B a schematic representation of a first embodiment of the turbine-engine blade seen from the front according to the invention;

in FIG. 2C a schematic representation of the first embodiment of the turbine-engine blade seen from the side according to the invention;

DETAILED DESCRIPTION OF THE INVENTION

The present document relates to a blade 2 comprising a root 6 made from a titanium-based alloy compatible with the materials used for a disc (or collar) carrying said roots 6 of the blade 2.

This compatibility makes it possible to envisage a direct assembly between the blade 2 extending longitudinally and the disc (or collar) by friction welding for example. Said blade 2 furthermore includes a vane 4 comprising an aluminium alloy.

Figure 1:
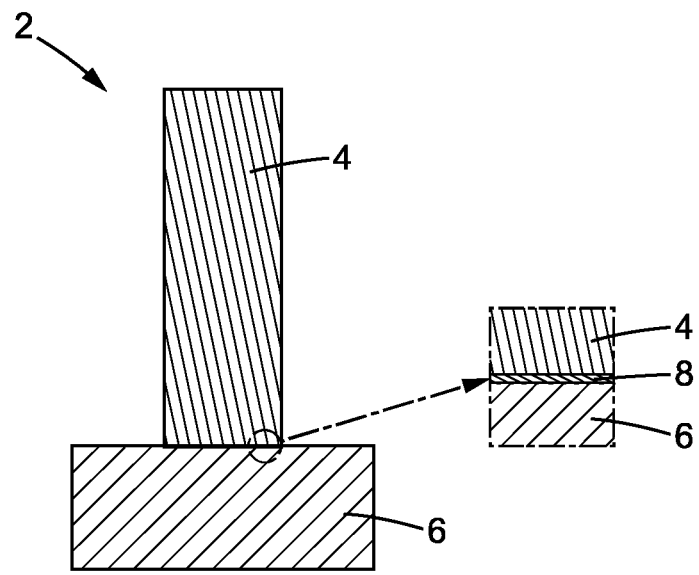
FIG. 1 shows a schematic representation of a turbine-engine blade.
Figure 2:
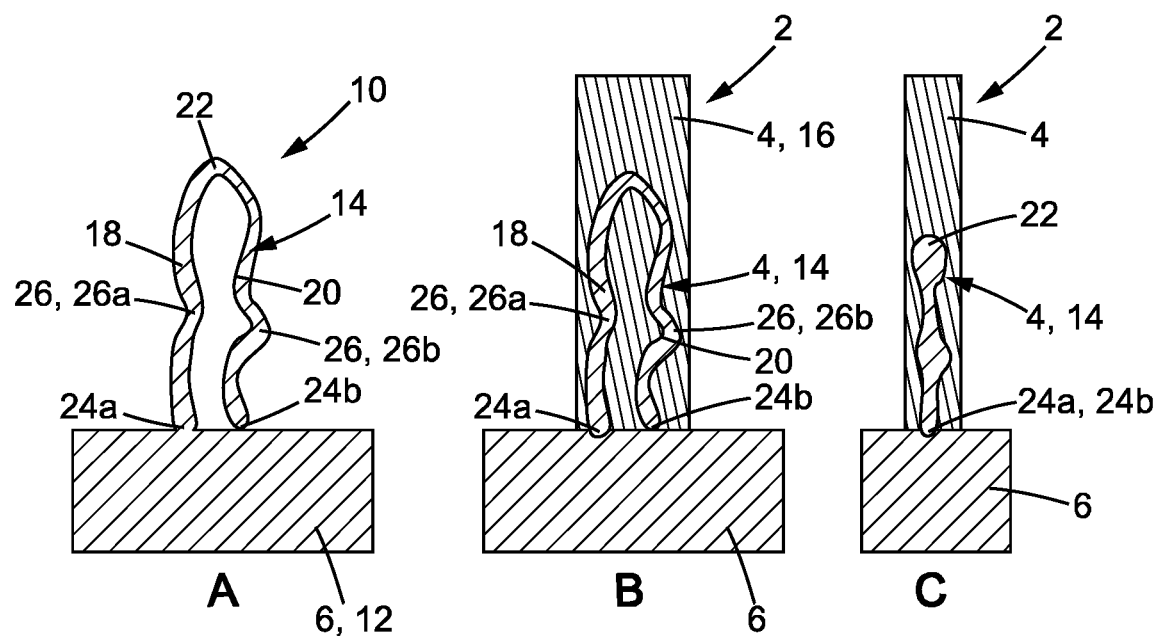
FIG. 2 shows.

FIG. 2 illustrates a schematic representation of a first embodiment of a turbine-engine blade 2 according to the present document. More precisely FIG. 2A illustrates a schematic representation of an assembly 10 comprising a first part 12 and a second part 14. FIG. 2B is a schematic representation of a turbine-engine blade 2 seen from the front and FIG. 2C is a schematic representation of a turbine-engine blade 2 seen from the side.

As illustrated in FIG. 2, the second part 14 comprises a general U shape adapted to extend projecting from the first part 12 in the longitudinal direction over a longitudinal dimension of between 20 and 90% of the longitudinal dimension of the blade. This second part 14 is intended to form, with a third part 16 the vane of the blade. This second part 14 includes a first arm 18 and a second arm 20 that are connected to each other by a top part 22. The first arm 18 and second arm 20 each comprise an end 24a, 24b on a side opposite to the top part 22. These ends 24a, 24b of the first arm 18 and of the second arm 20 are each connected to the first part 12. One or other or both of the first arm 18 and second arm 20 comprise protrusions 26. These protrusions 26 comprise protrusions extending transversely to the inside 26a of the general U shape and/or protrusions extending transversely towards the outside 26b of the general U shape. These protrusions 26 form attachment zones comprising a surface state such that attachment to the third part 16 is optimised.

The first part 12 is intended to form the root 6 of the blade 2. The first part 12 may have a shape initially distinct from the final shape of the root 6 of the blade 2. This first part 12, which may form a preform of the root, can thus be machined in order to match the final shape of the root 6 of the blade 2 required.

Figure 3:
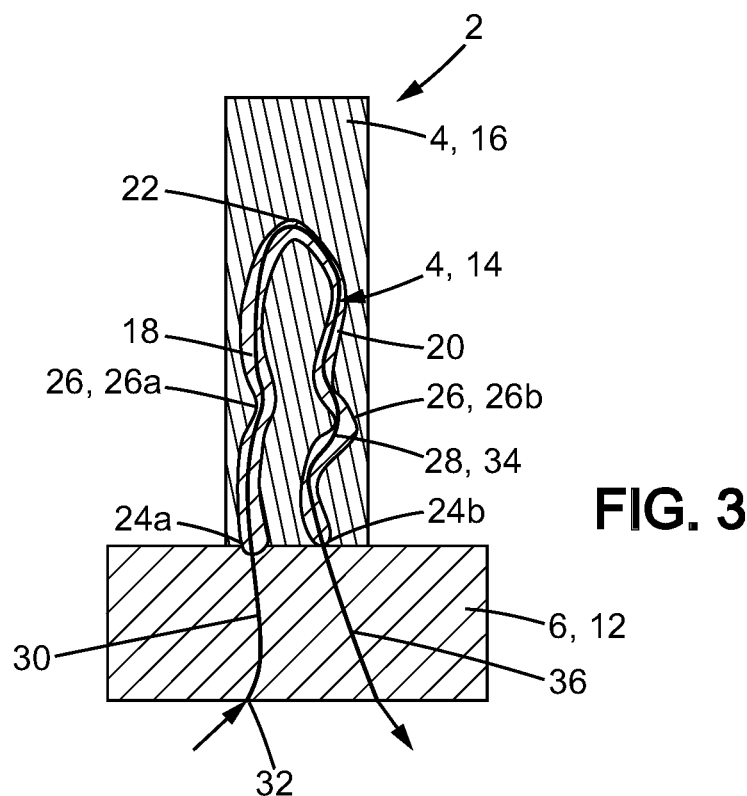
FIG. 3 shows a schematic representation of a second embodiment of a turbine-engine blade including an air-circulation circuit according to the invention.

According to a second embodiment illustrated in FIG. 3, the blade 2 includes a first part 12, a second part 14 and a third part 16 in a similar manner to the first embodiment. In this embodiment, the second part 14 includes an internal air-circulation circuit 28. This internal air-circulation circuit 28 includes a first section 30 having an end 32 emerging outside the first part 12, on the opposite side to the vane 4.

This internal circulation circuit 28 furthermore comprises a second section 34 passing inside the second part 14 having a general U shape and a third section 36 connected continuously to the second section 34 and emerging outside the first part on the opposite side to the vane.

Figure 4:
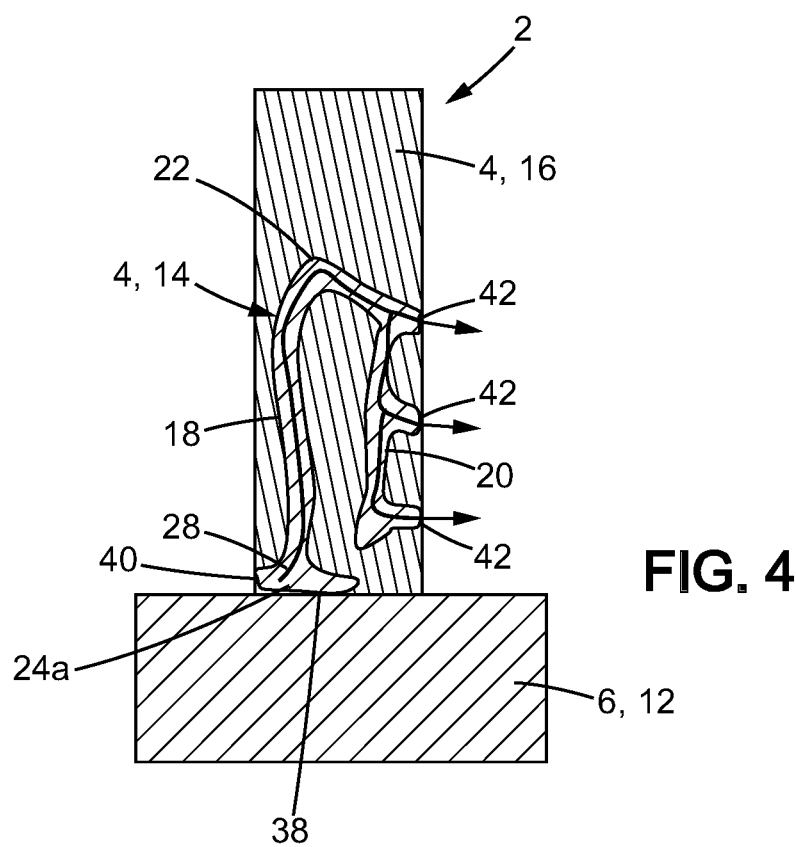
FIG. 4 shows a schematic representation of a third embodiment of a turbine-engine blade including an air-circulation circuit according to the invention.

According to a third particular embodiment illustrated in FIG. 4, the blade 2 includes a first part 12, a second part 14 and a third part 16 in a similar manner to the first embodiment. In this third embodiment, an internal air-circulation circuit 28 begins in the first arm 18 at the end opposite to the top part. This end opposite to the top part 22 includes a first zone 38 adjacent to the first part 12 and a second zone 40 emerging outside the blade 2. This second zone 40 can comprise a single zone emerging outside the blade or a plurality of zones emerging outside the blade over a dimension of between 0 and 80% of a longitudinal dimension of the third part. The second arm 20 of the second part 14 is free, i.e. not connected to the first part 12, and comprises air outlets 42 emerging on an external surface of the third part 16. These air outlets 42 may, for example, be three in number but this number of air outlets is not limitative and there may be a single air outlet or a plurality.

Figure 5:
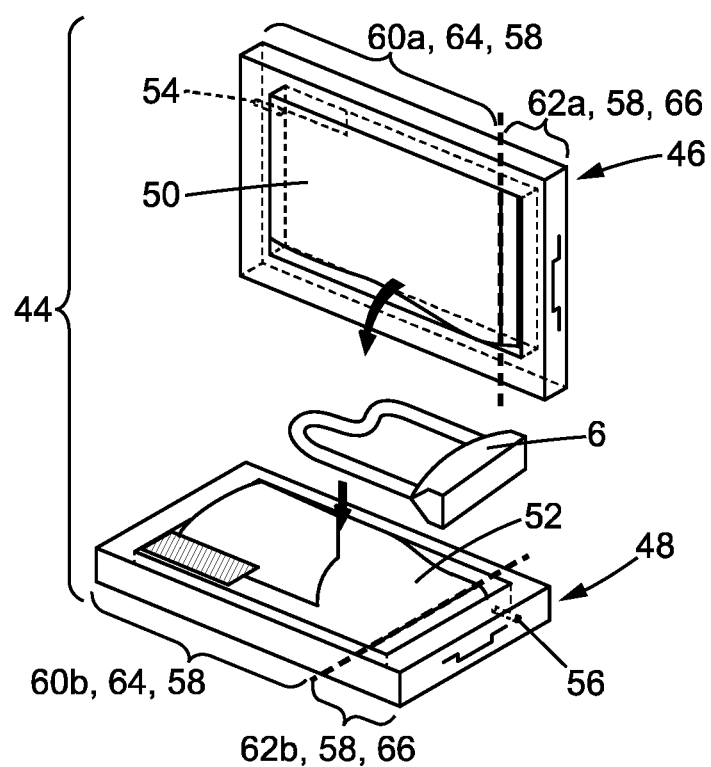
FIG. 5 shows a schematic representation of a mould according to the invention.

As illustrated in FIG. 5, a mould 44 is used to manufacture such a blade 2. Said blade 2 to be manufactured ultimately matches the geometry of the mould 44. The mould 44 comprises at least a first shell 46 and a second shell 48 which, arranged one against the other, form said mould 44. The first shell 46 includes a first internal face forming a first impression 50. The second shell 48 includes a second internal face forming a second impression 52. When the first shell 46 and the second shell 48 are assembled one against the other, the first impression 50 and the second impression 52 form together a cavity 58 in which the blade is intended to be formed.

The first impression 50 and the second impression 52 each comprise a first zone 60a, 60b and a second zone 62a, 62b. The first zone 60a of the first impression 50 delimits, with a first zone 60b of the second impression 52, a first space 64 of the cavity 58, which is intended to form the vane. The second zone 62a of the first impression 50 delimits, with the second zone 62b of the second impression 52, a second space 66 of the cavity 58, which is intended to receive the first part 12 of the blade 2. The first space 64 of the cavity 58 and the second space 66 of the cavity 58 form together the internal cavity 58 of the mould 44 intended to receive the second part 14 of the blade 2.

The first shell 46 includes a first internal channel 54, a first end of which emerges at the first part 64 of the cavity 58 and a second end of which emerges outside said mould 44. The second shell 48 includes a second internal channel 56, a first end of which emerges at the second part 66 of the cavity 58 and a second end of which emerges outside said mould 44.

The first space 64 of the cavity 58 delimits a zone into which a liquid metal intended to form the third part of the blade is injected. The second space 66 of the cavity 58 is furthermore able to receive in particular the root of the blade preferably manufactured by additive manufacturing.

According to the present document, the first part 12 is arranged in the second space 66 of the cavity 58 and the second part 14 is arranged in the first space 64 of the cavity 58. The aluminium-based alloy is injected so as to form the third part 16 and to embed the second part 14, the second part then being surrounded by the third part. The second 14 and the third part 16 thus form the vane 4 of the blade 2.

It will be understood that the second part 14 ensures attachment of the third part 16 on the second part 14, the latter therefore forming a means of attachment between the root and the third part 16 intended to form the part of the aluminium-alloy vane 2. This is because the shape of the second part 14 and in particular the protrusions produce a large specific surface area providing effective anchoring of the second part 14 with the third part 16. The shape of the second part provides radial mechanical holding and the surface state optimises attachment in a transverse direction by increasing the specific surface area. This surface state furthermore compensates for shrinkages related to a solidification of the third part around the U.

Through its shape, the second part 14 furthermore stiffens the vane when the vane is not sufficiently stiff. This second part 14 therefore forms, through its arrangement and constitution, a means for adjusting the stiffness of the vane.

The internal air-circulation circuit 28 of the second part can heat the vane and thus avoids the accretion of ice by circulation of air in the internal structure of the vane. This internal air-circulation circuit 28 also modifies the aerodynamics of the vane 4 and takes off a limit layer circulating in the vicinity of the external surface of the third part forming a trailing edge.

The first part 12 is advantageously made from a titanium-based alloy having a melting point of between 1600 and 1700° C. and the second is made from an aluminium-based alloy having a melting point of between 500 and 600° C. This difference between the melting points of aluminium and titanium limits the interactions between the third part 16 on the one hand and the first part 12 and the second part 14 on the other hand and thus limits the formation of fragile phases.

The first part 12 and the second part can be obtained by means of an additive manufacturing method. In this way, the second part 14 can have any and shape adapted to the attachment of the third part 16 on the second part 14.

The invention claimed is:

1. A method for manufacturing a blade (2) for a turbine engine, including a root (6) connected to a vane (4) extending in a longitudinal direction, the method comprising the steps:
   providing an assembly (10) comprising:
      a first part (12) intended to form the root (6) of the blade (2), this first part (12) being produced from a titanium-based alloy,
      a projecting second part (14) extending in the longitudinal direction from the first part (12);
   providing a mould comprising a first impression (50) and a second impression (52) delimiting together a cavity (58) in which the blade is intended to be formed, said cavity (58) comprising a first space (64) intended to form the vane and a second space (66) intended to receive the first part;
   arranging the second part in the first space (64) of the cavity (58) and the first part in the second space (66) of the cavity (58);
   injecting an aluminum-based alloy into the cavity, this aluminum-based alloy forming a third part (16) in which the second part (14) is embedded, whereby the second part comprises a general U shape including a first arm (18) and a second arm (20) connected by a top part (22), wherein the first arm (18) and/or the second arm (20) include protrusions (26).

2. The method for manufacturing a blade according to claim 1, wherein the assembly (10) is produced by additive manufacturing.

3. The method for manufacturing a blade according to claim 1, wherein the protrusions (26) include protrusions extending transversely towards the inside (26a) of the general U shape and/or protrusions extending transversely towards the outside (26b) of the general U shape.

4. A method for manufacturing a blade (2) for a turbine engine, including a root (6) connected to a vane (4) extending in a longitudinal direction, the method comprising the steps:
   providing an assembly (10) comprising:
      a first part (12) intended to form the root (6) of the blade (2), this first part (12) being produced from a titanium-based alloy,
      a projecting second part (14) extending in the longitudinal direction from the first part (12);
   providing a mould comprising a first impression (50) and a second impression (52) delimiting together a cavity (58) in which the blade is intended to be formed, said cavity (58) comprising a first space (64) intended to form the vane and a second space (66) intended to receive the first part;
   arranging the second part in the first space (64) of the cavity (58) and the first part in the second space (66) of the cavity (58);
   injecting an aluminum-based alloy into the cavity, this aluminum-based alloy forming a third part (16) in which the second part (14) is embedded;
   wherein said second part (14) includes at least one internal air-circulation circuit (28) able to receive hot air coming from outside the blade (2).

5. The method for manufacturing a blade according to claim 4, wherein the at least one internal air-circulation circuit (28) comprises air outlets (42) emerging on an external surface of the third part (16).

6. The method for manufacturing a blade according to claim 4, wherein the second part comprises a general U shape including a first arm (18) and a second arm (20) connected by a top part (22).

7. The method for manufacturing a blade according to claim 6, wherein the at least one internal air-circulation circuit (28) comprises air outlets (42) emerging on an external surface of the third part (16).

* * * * *